US 8,810,481 B2

(12) United States Patent
Hayashibe et al.

(10) Patent No.: US 8,810,481 B2
(45) Date of Patent: Aug. 19, 2014

(54) OPTICAL DEVICE, IMAGE DISPLAY APPARATUS AND HEAD-MOUNTED DISPLAY UNIT

(71) Applicant: Sony Corporation, Tokyo (JP)

(72) Inventors: Kazuya Hayashibe, Miyagi (JP); Hiroshi Tanaka, Miyagi (JP); Teppei Imamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/926,931

(22) Filed: Jun. 25, 2013

(65) Prior Publication Data

US 2013/0286455 A1    Oct. 31, 2013

Related U.S. Application Data

(62) Division of application No. 13/160,596, filed on Jun. 15, 2011, now Pat. No. 8,552,926.

(30) Foreign Application Priority Data

Jun. 25, 2010  (JP) ................................ 2010-144453

(51) Int. Cl.
*G09G 5/00*      (2006.01)
(52) U.S. Cl.
USPC ............................................................ 345/7
(58) Field of Classification Search
USPC ............ 359/13, 196.1–226.3, 618, 629, 630, 359/631, 632, 633, 839; 348/115; 345/7
See application file for complete search history.

(56) References Cited

U.S. PATENT DOCUMENTS

| 2005/0180687 A1 | 8/2005 | Amitai |
| 2005/0270655 A1 | 12/2005 | Weber et al. |
| 2007/0070859 A1 | 3/2007 | Hirayama |
| 2007/0279755 A1* | 12/2007 | Hitschmann et al. ......... 359/630 |
| 2008/0239422 A1 | 10/2008 | Noda |
| 2009/0251788 A1* | 10/2009 | DeJong et al. ................ 359/633 |
| 2010/0046070 A1* | 2/2010 | Mukawa ....................... 359/480 |
| 2011/0013245 A1 | 1/2011 | Tanaka et al. |

FOREIGN PATENT DOCUMENTS

| JP | 2005-521099 A | 7/2005 |
| JP | 2006-162767 A | 6/2006 |

* cited by examiner

*Primary Examiner* — Stephone B Allen
*Assistant Examiner* — Kimberly N Kakalec
(74) *Attorney, Agent, or Firm* — Wolf, Greenfield & Sacks, P.C.

(57) ABSTRACT

Disclosed herein is an image display apparatus, including: a light source; and a scanning section adapted to scan a light beam emitted from the light source; the scanning section including (a) a first mirror, (b) a first light deflection section, (c) a second mirror, and (d) a second light deflection section; the second light deflection section including an external light receiving face; the second light deflection section having a plurality of translucent films provided in the inside thereof; the translucent films having a light reflectivity $R_2$ at a wavelength of the light beam which satisfies: $R_2 \leq k \times \{(P_2/t_2) \times \tan(\zeta_2)\}^{1/2}$ where k is a constant higher 0 but lower than 1, $P_2$ an array pitch of the translucent films, $t_2$ a thickness of the second light deflection section, and $\zeta_2$ an angle formed between the light emitting face and the translucent films.

8 Claims, 11 Drawing Sheets

[PUPIL OF OBSERVER]

OPTICAL DEVICE, IMAGE DISPLAY APPARATUS AND HEAD-MOUNTED DISPLAY UNIT

CROSS REFERENCES TO RELATED APPLICATIONS

The application claims the benefit under 35 U.S.C. §120 as a divisional application of U.S. patent application Ser. No. 13/160,596, filed Jun. 15, 2011, which claims priority to Japanese Patent Application No. JP 2010-144453, filed in the Japanese Patent Office on Jun. 25, 2010, the entire contents of each of which are incorporated herein by reference.

BACKGROUND OF THE INVENTION

1. Field of the Invention

This invention relates to an optical device, an image display apparatus and a head-mounted display unit.

2. Description of the Related Art

A virtual image display apparatus or image display apparatus is known and disclosed, for example, in JP-T-2005-521099 or Japanese Patent Laid-Open No. 2006-162767. In the virtual image display apparatus, a two-dimensional image formed by an image forming apparatus is expanded by a virtual image optical system such that it is observed as an enlarged virtual image by an observer.

A virtual image display apparatus of the type described is schematically shown in FIG. 10. Referring to FIG. 10, the image display apparatus 200 shown includes an image forming apparatus 201 including a plurality of pixels arrayed in a two-dimensional matrix, and a collimate optical system 202 for converting light emitted from the pixels of the image forming apparatus 201 into parallel light. The image display apparatus 200 further includes light guide means 203 which receives parallel light from the collimate optical system 202, guides the parallel light therein and emits the parallel light therefrom. The light guide means 203 includes a light guide plate 204 from which incident light is emitted after it propagates by total reflection in the inside of the light guide plate 204. The light guide means 203 further includes first deflection means 205 formed, for example, from a single layer of a light reflecting film for reflecting light incident to the light guide plate 204 so that the light is reflected totally in the inside of the light guide plate 204. The light guide section 203 further includes second deflection means 206 formed, for example, from a light reflecting multilayer film having a multilayer lamination structure for emitting light propagated by total reflection in the inside of the light guide plate 204 from the light guide plate 204. If the image display apparatus 200 having such a configuration as just described is used to configure, for example, a head-mounted display (HD) unit, then the unit can be formed in a light-weighted small-sized form.

SUMMARY OF THE INVENTION

Incidentally, in the image display apparatus 200 described above, the image forming apparatus 201 has a structure including a plurality of pixels arrayed in a two-dimensional matrix and is configured, for example, from a liquid crystal display apparatus of the transmission type or the reflection type such as a LCOS (Liquid Crystal On Silicon) liquid crystal display apparatus. Accordingly, it is difficult to achieve miniaturization of the image forming apparatus 201. Further, in the image display apparatus 200 described, since it includes the image forming apparatus 201 and the collimate optical system 202, also it is difficult to achieve miniaturization and reduction in weight of the entire image display apparatus.

Accordingly, it is desirable to provide an image display apparatus which can be reduced in overall size and weight and a head-mounted display unit to which the image display apparatus is applied.

An image display apparatus according to a first embodiment or a second embodiment of the disclosure includes:

a light source; and scanning means for scanning a light beam emitted from the light source;

the scanning means including (a) a first mirror mounted for pivotal motion around a pivotal motion axis thereof provided by a first axis extending in a first direction for receiving the light beam emitted from the light source and incident thereto, (b) first light deflection means having an axial line extending along a second direction different from the first direction for receiving the light beam emitted from the first mirror and incident thereto at a first incidence angle and emitting parallel light at a predetermined first emergence angle with respect to the second direction depending upon the first incidence angle of the light beam by the pivotal motion of the first mirror, (c) a second mirror mounted for pivotal motion around a pivotal motion axis thereof provided by a second axis extending in a third direction and for receiving the parallel light emitted from the first light deflection means and incident thereto, and (d) second light deflection means having an axial line extending along a fourth direction different from the third direction for receiving the parallel light emitted from the second mirror and incident thereto at a second incidence angle and emitting parallel light at a predetermined second emergence angle with respect to the fourth direction depending upon the second incidence angle of the parallel light by the pivotal motion of the second mirror;

the second light deflection means including an external light receiving face provided in an opposed relationship to a light emitting face provided in parallel to the fourth direction for receiving external light incident thereto;

the second light deflection means having a plurality of translucent films provided in the inside thereof.

Meanwhile, a head-mounted display unit according to the first embodiment or the second embodiment includes:

(A) a frame of the eyeglasses type adapted to be mounted on the head of an observer; and (B) an image display apparatus attached to the frame. The image display apparatus of the head-mounted display unit is configured from the image display apparatus according to the first embodiment or the second embodiment described above.

In the image display apparatus or the head-mounted display unit according to the first embodiment, the translucent films has a light reflectivity $R_2$ at a wavelength of the light beam which satisfies:

$$R_2 \leq k \times \{(P_2/t_2) \times \tan(\zeta_2)\}^{1/2} \quad (1)$$

where k is a constant higher than 0 but lower than 1, $P_2$ an array pitch of the translucent films, $t_2$ a thickness of the second light deflection means, and $\zeta_2$ an angle formed between the light emitting face and the translucent films. It is to be noted that the light reflectivity is evaluated with vertically incident light. This similarly applies also in the following description.

Meanwhile, in the image display apparatus or the head-mounted display unit according to the second embodiment, a light reflectivity of each of the translucent films in a wavelength band other than the wavelength of the light beam is lower than that at the wavelength of the light beam.

On the other hand, an optical device according to the first embodiment or the second embodiment of the disclosure has:

a light receiving face provided in parallel to one direction and adapted to receive light from a light source incident thereto;

a light emitting face provided in parallel to an axial line extending in a direction different from the one direction; and an external light receiving face provided in an opposing relationship to the light emitting face and adapted to receive external light incident thereto;

the optical device having a plurality of translucent films provided therein;

the translucent films being arrayed in parallel to each other in a spaced relationship from each other along the axial line and disposed in an inclined relationship to the axial line;

light from the light source incident to the light receiving face being reflected by the translucent films and emitted from the light emitting face while external light incident from the external light receiving face is emitted from the light emitting face.

In the optical device according to the first embodiment, the translucent films has a light reflectivity R at a wavelength of the light from the light source which satisfies:

$$R \leq k \times \{(P/t) \times \tan(\zeta)\}^{1/2} \quad (2)$$

where k is a constant higher than 0 but lower than 1, P an array pitch of the translucent films, t a thickness of the optical device, and $\zeta$ an angle formed between the light emitting face and the translucent films.

Meanwhile, in the optical device according to the second embodiment, a light reflectivity of each of the translucent films in a wavelength band other than the wavelength of the light from the light source is lower than that in the wavelength of the light from the light source.

The image display apparatus or the head-mounted display unit according to the first embodiment or the second embodiment of the disclosure includes the first mirror, first light deflection means, second mirror and second light deflection means, and converts and emits a light beam emitted from the light source into and as parallel light. Accordingly, an image forming apparatus itself formed, from example, from a liquid crystal display apparatus is not required. Besides, there is no necessity to produce, for example, a two-dimensional image once as an intermediate image in the inside of the scanning means. In other words, an image forming optical system is not required. Therefore, reduction in size of the light source or the scanning means and hence reduction in size and weight of the entire image display apparatus can be anticipated. In the image display apparatus or the head-mounted display unit according to the first embodiment or the second embodiment, the parallel light originating from the light beam emitted from the light source and emitted finally from the second light deflection means is introduced into the eyeballs of an observer. Then, the parallel light passes through the pupil, which usually has a diameter of approximately 2 to 6 mm, of each eyeball and forms an image on the retina, through which it is recognized as one pixel. This is because the light emitted from the second light deflection means is parallel light. Then, such operations are repeated by a plural number of times to allow the observer to recognize a two-dimensional image.

Besides, in the image display apparatus or the head-mounted display unit according to the first embodiment, the light reflectivity $R_2$ of the translucent films with regard to the wavelength of the light beam satisfies $$R_2 \leq k \times \{(P_2/t_2) \times \tan(\zeta_2)\}^{1/2} \quad (1).$$

Meanwhile, in the optical device according to the first embodiment, the light reflectivity R of the translucent films with regard to the wavelength of the light from the light source satisfies $$R \leq k \times \{(P/t) \times \tan(\zeta)\}^{1/2} \quad (2).$$

Accordingly, the light intensity of the reflection of external light when the external light is incident from the external light receiving face, comes to and is reflected by a translucent film and then comes to and is reflected by another translucent film can be reduced. As a result, occurrence of ghosting can be suppressed.

On the other hand, in the image display apparatus, the head-mounted display unit or the optical device according to the second embodiment, the light reflectivity of each of the translucent films in the wavelength band other than the wavelength of the light beam or the light from the light source is lower than that at the wavelength of the light beam or the light from the light source. Accordingly, the reflection of external light when the external light is incident from the external light receiving face, comes to and is reflected by a translucent film and then comes to and is reflected by another translucent film can be reduced. As a result, occurrence of ghosting can be suppressed.

The above and other features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1A:
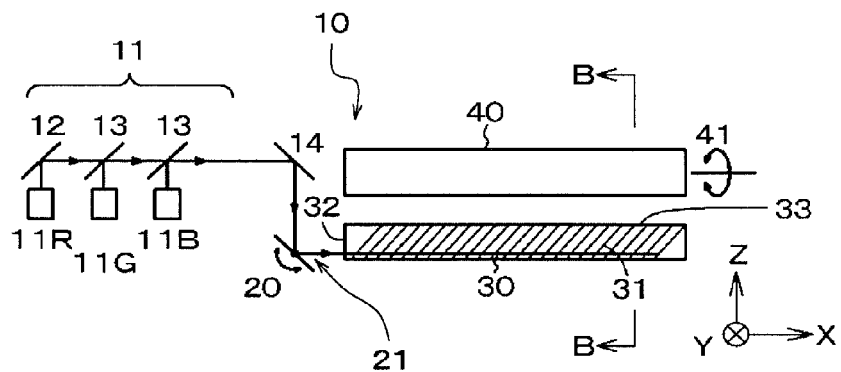
FIGS. 1A and 1B are schematic views showing an image display apparatus according to a working example 1.

In the following, the embodiments of present invention is described in detail in connection with preferred working examples thereof with reference to the accompanying drawings. However, the present invention is not limited to the working examples and various numerical values and materials specified in the description of the working examples are for illustrative purposes only. It is to be noted that description is given in the following order.

1. General Description of the Optical Device According to the First and Second Embodiments of the Invention, the Image Display Apparatus According to the First and Second Embodiments of the Invention and the Head-Mounted Display Unit According to the First and Second Embodiments of the Invention 2. Working Example 1 (optical device and image display apparatus according to the first embodiment of the invention)

3. Working Example 2 (head-mounted display unit according to the first embodiment of the invention)

4. Working Example 3 (optical device, image display apparatus and head-mounted display unit according to the second embodiment of the invention), Others In the optical device, image display apparatus or head-mounted display unit according to the first embodiment, the constant k can be set so as to satisfy $0.01 \leq k \leq 0.3$, preferably set so as to satisfy $0.02 \leq k \leq 0.2$, and most preferably, for example, set to $k=0.1$. The optical device, image display apparatus or head-mounted display unit according to the first embodiment including this preferred form may be configured such that each of the translucent films reflects one of an S polarized light component and a P polarized light component but passes the other of the polarized light components therethrough, and the image display apparatus further includes a polarization section provided on the external light receiving face side and adapted to pass the other of the polarized light components therethrough.

The optical device, image display apparatus or head-mounted display unit according to the second embodiment may be formed such that the wavelength band other than the wavelength of the light beam or the light from the light source is defined as a wavelength band equal to or longer than 420 nm but equal to or shorter than 680 nm except wavelengths within a range from $\lambda_0-20$ to $\lambda_0+20$ where $\lambda_0$ is a peak wavelength of the light beam or the light from the light source whose unit is nm, and the light reflectivity average value $R_{WB-ave}$ in the wavelength band other than the wavelength of the light beam or the light from the light source is lower than the light reflectivity average value $R_{LS-ave}$ within the range from $\lambda_0-20$ to $\lambda_0+20$. In this instance, preferably $0.01 \leq R_{WB-ave}/R_{LS-ave} \leq 1/1.41$ is satisfied, and more preferably, $0.05 \leq R_{WB-ave}/R_{LS-ave} \leq 0.5$ is satisfied. Further, in the optical device, image display apparatus or head-mounted display unit according to the second embodiment including those preferred forms, preferably the light reflectivity at the wavelength of the light beam or the light from the light source is 5% or less upon vertical incidence. Further, the optical device, image display apparatus or head-mounted display unit according to the second embodiment including those preferred forms may be formed such that each of the translucent films reflects one of an S polarized light component and a P polarized light component but passes the other of the polarized light components therethrough, and the image display apparatus further includes a polarization section provided on the external light receiving face side and adapted to pass the other of the polarized light components therethrough.

The optical device, image display apparatus and head-mounted display unit according to the first embodiment including the preferred forms described above are sometimes referred to collectively and simply as "first embodiment of the disclosure." Meanwhile, the optical device, image display apparatus and head-mounted display unit according to the second embodiment including the preferred forms described above are sometimes referred to collectively and simply as "second embodiment of the disclosure." Further, the optical devices according to the first and second embodiments including the preferred forms described above are sometimes referred to collectively and simply as "optical device of the disclosure." Further, the image display apparatus according to the first and second embodiments including the preferred forms described above are sometimes referred to collectively and simply as "image display device of the disclosure." Further, the head-mounted display units according to the first and second embodiments including the preferred forms described above are sometimes referred to collectively and simply as "head-mounted display unit of the disclosure." Furthermore, the first and second embodiments of the disclosure are sometimes referred to collectively and simply as "present disclosure."

In the head-mounted display unit of the present disclosure, the frame includes a front portion disposed in front of an observer, two temple portions attached for pivotal motion to the opposite ends of the front portion through hinges, and modern portions individually attached to end portions of the temple portions;

the light source is disposed at an upper portion of each temple portion or the front portion;

the first mirror, first light deflection section and second mirror are disposed at an upper portion of the front portion; and the second light deflection section is disposed in an opposing relationship to each of the pupils of the observer (or in other words, disposed at a position corresponding to an attached position of a lens of the frame of ordinary eyeglasses). Or, the light source itself may be provided at each temple portion such that a light beam is introduced to the front portion through an optical fiber. The arrangement described is suitable for a case in which the observer has a sufficient visual acuity with the naked eye or in which contact lenses or the like are used. However, in the case where the observer uses ordinary eyeglasses for visual correction, also it is possible to dispose the second light deflection section on the outer side of each lens of the eyeglasses.

Or the head-mounted display unit may be configured otherwise such that the first mirror, first light deflection section, second mirror and second light deflection section are disposed at an upper portion of the front portion.

It is to be noted that the light receiving face through which the light beam or the light from the light source emitted from the first mirror is incident to the first light deflection section is referred to as "first light receiving face" for the convenience of description. Further, the light receiving face through which the parallel light emitted from the second mirror is incident to the second light deflection section is referred to as "second light receiving face" for the convenience of description. Further, the light emitting face through which the parallel light is emitted from the first light deflection section is referred to as "first light emitting face" for the convenience of description. Furthermore, the light emitting face through which the parallel light is emitted from the second light deflection section is referred to as "second light emitting face" for the convenience of description.

The scanning section which configures the image display apparatus of the disclosure and the head-mounted display units of the disclosure including the preferred configurations described above (such scanning sections are sometimes referred to collectively as "scanning sections of the present disclosure") may be formed such that, where the first emergence angle $\theta_{0-1}$ of the parallel light emitted from the first light deflection section toward a direction away from the first mirror is an emergence angle of a positive value, as the first incidence angle $\theta_{I-1}$ of the light beam to the first light deflection section increases, the first emergence angle $\theta_{0-1}$ changes its direction from that of a negative value to that of a positive value. In this instance, where the second emergence angle $\theta_{0-2}$ of the parallel light emitted from the second light deflection section toward a direction away from the second mirror is an emergence angle of a positive value, as the second incidence angle $\theta_{I-2}$ of the parallel light to the second light deflection section increases, the second emergence angle $\theta_{0-2}$ changes its direction from that of a negative value to that of a positive value. It is to be noted that the first incidence angle $\theta_{I-1}$ is defined as an angle formed between the light beam incident to the first light deflection section and the second direction. Meanwhile, the first emergence angle $\theta_{0-1}$ is defined as an angle formed between the parallel light emitted from the first light deflection section and a normal to the first light emitting face of the first light deflection section. Similarly, the second incidence angle $\theta_{I-2}$ is defined as an angle formed between the light beam incident to the second light deflection section and the fourth direction. Meanwhile, the second emergence angle $\theta_{0-2}$ is defined as an angle formed between the parallel light emitted from the second light deflection section and a normal to the second light emitting face of the second light deflection section. Further, the value of the first incidence angle $\theta_{I-1}$ formed between the second direction and the light beam which propagates in the inside of the first light deflection section and then advances toward the first light emitting face of the first light deflection section is defined as a positive value. Similarly, the value of the second incidence angle $\theta_{I-2}$ formed between the fourth direction and the light beam which propagates in the inside of the second light deflection section and then advances toward the second light emitting face of the second light deflection section is defined as a positive value.

The scanning sections of the present disclosure including the preferred form described above may be configured such that the light beam incident to the first light deflection section is expanded in the second direction by the first light deflection section, and the parallel light incident to the second light deflection section is expanded in the fourth direction by the second light deflection section. Consequently, the parallel light obtained finally is in a form expanded two-dimensionally in the second and fourth directions.

The image display apparatus or the head-mounted display units of the present disclosure including the preferred forms and configurations described hereinabove may be configured such that an image is formed from an array of totaling P×Q pixels arrayed such that P pixels are arrayed along the second direction and Q pixels are arrayed along the fourth direction and the first incidence angle $\theta_{I-1}$ is defined in response to the position of the P pixels along the second direction while the second incidence angle $\theta_{I-2}$ is defined in response to the Q pixels along the fourth direction. By emission of a light beam once from the light source, one pixel of a display image is obtained finally. Accordingly, in order to display the P×Q pixels, emission of a light beam is carried out by P×Q times. The first and second mirrors have a function of converting position information of a pixel into a kind of angle information. The second direction and the fourth direction preferably have a perpendicular relationship to each other.

Further, the image display apparatus or the head-mounted display units of the present disclosure including the preferred forms and configurations described hereinabove is configured preferably such that the number of times of pivotal motion, or in other words, the oscillation frequency, of the first mirror per unit time is higher than the number of times of pivotal motion or oscillation frequency of the second mirror per unit time. Or, the number of times of pivotal motion of the second mirror may be higher than those of the first mirror. For pivotal motion of the first mirror or the second mirror, for example, a sine wave signal, a rectangular wave signal or a sawtooth wave signal may be input to a pivoting mechanism provided for the first mirror or the second mirror. The frequency of the signal for driving the first mirror is determined from the number of pixels along the second direction, the duty of the second mirror, the frame rate and so forth and is, for example, 15 Hz, 30 Hz, 60 Hz, 120 Hz, 180 Hz, 240 Hz or the like. In the case where the first mirror or the second mirror is configured from a MEMS (Micro Electra Mechanical Systems) having micromirrors mounted for pivotal motion around one axis, for example, the pivotal motion of the first mirror at a high speed may be carried out based on resonance while the pivotal motion of the second mirror at a low speed is carried out based on non-resonance. Or, the pivotal motion of both of the first and second mirrors may be carried out based on resonance.

Further, the image display apparatus or the head-mounted display units of the present disclosure including the preferred forms and configurations described hereinabove may be configured such that the first direction and the fourth direction coincide with each other or extend in parallel to each other and the second direction and the third direction coincide with each other or extend in parallel to each other, and the first and fourth directions and the second and third directions are orthogonal to each other. In this instance, the image display apparatus or the head-mounted display units may be formed such that an image observation position is positioned in the fifth direction with respect to the second light deflection section, and the fifth direction has an orthogonal relationship to the first and fourth directions and also to the second and third directions. However, the directions may not necessarily have a parallel or orthogonal relationship to each other.

In the disclosure including the preferred forms and configurations described above, a plurality of translucent films or half mirrors are provided in the inside of the first light deflection section, and another plurality of translucent films or half mirrors are provided in the second light deflection section. The translucent films may be configured from metal films made of a metal including an alloy or configured from dielectric films of $MgF_X$ or else from a multilayer laminate structure in which a large number of conductor layer films are laminated. The dielectric laminate films are configured for example, from a $Si_3N_4$ film as a high dielectric material and a $MgF_2$ film as a low dielectric material or configured from a $TiO_2$ film, a $NbO_X$ film or a $TaO_X$ films as a high dielectric material and a $SiO_2$ film as a low dielectric material. Formation of the translucent films or half mirrors can be carried out by various physical vapor deposition methods (PVD methods) including vacuum deposition and sputtering and various chemical vacuum deposition methods (CVD methods) depending upon the material to be used.

Further, in the disclosure including the preferred forms and configurations described above, a large number of translucent films may have an equal light reflectivity or may have different light reflectivities depending upon the disposition position thereof in the inside of the first or second light deflection section. In the latter case, preferably the translucent films in the first light deflection section are configured such that a comparatively high light reflectivity is provided to a translucent film positioned at a comparatively far position from the first mirror. Meanwhile, preferably the translucent films in the second light deflection section are configured such that a comparatively high light reflectivity is provided to a translucent film positioned at a comparatively far position from the second mirror. In other words, preferably he translucent films in the first light deflection section are configured such that a comparatively low light transmission factor is provided to a translucent film positioned at a comparatively far position from the first mirror. Meanwhile, preferably the translucent films in the second light deflection section are configured such that a comparatively low light transmission factor is provided to a translucent film positioned at a comparatively far position from the second mirror. The light incidence angle dependency of the light transmission factor of the translucent films, that is, the relationship that, as the incidence angle of light incident to the translucent films increases, the light reflectivity increases, may be utilized. By gradually increasing the light reflectivity in this manner, it is possible to make the intensity of light reflected by a portion of the first light deflection section positioned spaced away from the first mirror nearer to the intensity of light reflected by a portion of the first light deflection section positioned rear to the first mirror. This similarly applies also to the second light deflection section.

In the disclosure, a light beam incident from the first mirror passes through the plural translucent films disposed in the inside of the first light deflection section and is reflected by the translucent films and then emitted as parallel light from the first light deflection section. The parallel light incident from the second mirror passes through the plural translucent films disposed in the inside of the second light deflection section and is reflected by the translucent films and then emitted as parallel light from the second light deflection section. The angle of the translucent films in the first light deflection section with respect to the second direction is equal among all translucent films and ranges from 30 degrees to 70 degrees, preferably from 40 degrees to 60 degrees, and more preferably from 45 degrees to 55 degrees. Similarly, the angle of the translucent films in the second light deflection section with respect to the fourth direction is equal among all translucent films and ranges from 30 degrees to 70 degrees, preferably from 40 degrees to 60 degrees, and more preferably from 45 degrees to 55 degrees. The array pitch of the translucent films may be fixed or may differ. The second light deflection section is formed as that of the see-through type or half-transmission or translucent type so that an external field can be observed through the second light deflection section. The first light deflection section may have a length of 5 mm or more as a length thereof along the second direction, a height of 0.5 mm or more as a length along the fourth direction, and a thickness of 1.0 mm or more as a length along the fifth direction. Meanwhile, the second light deflection section may have a length of 5 mm or more as a length thereof along the second direction, a height of 5 mm or more as a length along the fourth direction, and a thickness of 0.5 mm or more, for example, 2.5 mm to 5.0 mm, preferably 3.0 mm to 4.0 mm as a length along the fifth direction. Further, the second light deflection section may have an arrangement pitch of the translucent films of 0.5 mm to 1.5 mm.

Further, in the disclosure including the preferred forms and configurations described above, preferably an anti-reflection film is disposed on the first light receiving face and the first light emitting face of the first light deflection section. Preferably, an anti-reflection film is disposed on the second light receiving face, second light emitting face and light emitting face. Here, the anti-reflection film (Anti Reflection Coating; ARC) may be formed from at least one of materials selected from a group including, for example, silicon oxide ($SiO_X$), tantalum oxide ($TaO_X$), zirconium oxide ($ZrO_X$), aluminum oxide ($AlO_X$), chromium oxide ($CrO_X$), vanadium oxide ($VO_X$), titanium oxide (TiO), zinc oxide (ZnO), tin oxide (SnO), hafnium oxide ($HfO_X$), niobium oxide ($NbO_X$), scandium oxide ($ScO_X$), yttrium oxide ($YO_X$), silicon nitride ($SiN_Y$), titanium nitride (TiN), tantalum nitride (TaN), aluminum nitride (AlN), silicon oxynitride ($SiO_XN_Y$), aluminum fluoride ($AlF_X$), cerium fluoride ($CeF_X$), calcium fluoride ($CaF_X$), sodium fluoride ($NaF_X$), sodium aluminum fluoride ($Na_YAl_ZF_X$), lanthanum fluoride ($LaF_X$), magnesium fluoride ($MgF_X$), yttrium fluoride ($YF_X$) and zinc sulfide ($ZnS_X$). Or, the anti-reflection film may be configured in such a structure that at least two dielectric thin film layers of SiO, $SiO_2$, $TiO_2$, $ZrO_2$, $Ta_2O_5$ or $Y_2O_3$ are laminated like a laminate structure of, for example, a high reflectivity film/low reflectivity film/high reflectivity film/low reflectivity film, . . . . The anti-reflection film can be formed by various PVD methods including vacuum deposition and sputtering or various CVD methods depending upon the material to be used.

In the disclosure including the preferred forms and configurations described above, the light source is preferably configured from a light emitting element, particularly from a semiconductor laser device (LD), a solid-state laser, a light emitting diode (LED), a super luminescence diode (SLD), an organic EL light emitting device or an inorganic EL light emitting device. Further, the light source in a wide sense includes an optical fiber emitting end where the various types of light sources are introduced into an optical fiber. Here, the light source preferably includes a light emitting element for emitting red light, another light emitting element for emitting green light and a further light emitting element for emitting blue light, and a multiplexing section or color synthesis section. The multiplexing section multiplexes a red light beam, a green light beam and a blue light beam emitted from the light emitting elements into a single light beam. The multiplexing section may be formed, for example, from a dichroic prism, a dichroic mirror, a cross prism, a polarizing beam splitter or a half mirror. A light beam shaping section such as, for example, a collimate lens for converting the light beam emitted from the light source into a parallel light beam may be disposed between the light source and the first mirror. It is to be noted that, since this collimate lens merely passes one or a plurality of beams therethrough, such a great lens for passing a light source corresponding to an actual image therethrough as in a collimate optical system in the past is not demanded for the collimate lens. Further, in order to arrange the sectional shape of the light beam and in order to prevent appearance of undesirable scattered light or stray light, an aperture may be provided. The aperture may be disposed between the light source and the first mirror or between the first mirror and the first light deflection section. The aperture may have a circular shape, a square shape, a rectangular shape, a regular hexagonal shape or a regular octagonal shape. The aperture may have an area from $8\times10^{-5}$ cm² (which corresponds, in the case of a circular shape, to a diameter of 0.1 mm) to 0.8 cm² (which corresponds, in the case of a circular shape, to a diameter of 10 mm). The intensity of the light beam emitted from the light source depends upon the brightness of an image to be displayed and may be determined further taking the position of a pixel in the image to be displayed into consideration. In particular, for example, in the case where the first incidence angle $\theta_{I-1}$ and the second incidence angle $\theta_{I-2}$ are small, since the number of those translucent films through which the light beam or parallel light is to pass is great, the intensity of the light beam to be emitted from the light source may be increased.

The first mirror or the second mirror may be configured using, for example, a MEMS having micromirrors mounted for pivotal motion around one axis, a galvano mirror, or a polygon mirror. Further, it is not always necessary to use a mirror, but an arbitrary scanning section or scanning method may be used such as an electro-optical scanner, an acousto-optic scanner, movement of the collimate lens or pivotal motion of the light source itself. In particular, a first scanning section may be used in place of the first mirror while a second scanning section is used in place of the second mirror.

The first light deflection section and the second light deflection section are made of a material transparent with respect to incident light. The material for the first light deflection section or the second light deflection section may be glass including optical glass such as quartz glass or BK7 or a plastic material such as, for example, PMMA, a polycarbonate resin, an acrylic-based resin, an amorphous polypropylene-based resin, a styrene-based resin including an AS resin. It is to be noted that ordinary optical glass such as BK7 is high in working accuracy and reliability and therefore is preferably used. Further, if a material having a high refractive index is used, then the thickness of the first light deflection section or the second light deflection section can be reduced, and preferably, the refractive index is higher than 1.6.

The number of pixels may be determined based on specifications demanded for the image display apparatus and may be, as a particular value of the number of pixels, 320×240, 432×240, 640×480, 854×480, 1024×768, 1366×768 or 1920×1080.

The image display apparatus of the disclosure can be used to configure, for example, a head-mounted display unit and can achieve reduction in weight and size of the apparatus. The head-mounted display unit may include one image display apparatus of the disclosure (monocular type) or two image display apparatus of the disclosure (binocular type).

As described hereinabove, the frame includes a front portion disposed in front of an observer, two temple portions attached for pivotal motion to the opposite ends of the front portion through hinges, and modern portions individually attached to end portions of the temple portions. The frame further includes nose pads. When the entire head-mounted display unit is watched, the assembly of the frame and the nose pads has a structure substantially same as that of ordinary eyeglasses. The frame may be configured from a material same as that used for configure ordinary eyeglasses such as a metal or an alloy, a plastic material or a combination of them. Also the nose pads may be have a known configuration or structure.

From a point of view of the design of the head-mounted display unit or of facility in mounting of the head-mounted display unit, the head-mounted display unit is preferably formed such that wiring lines such as signal lines or power supply lines from one or two image display apparatus extend from the end portions of the modern portions to an external circuit or control circuit through the inside of the temple portions and the modern portions. More preferably, the head-mounted display unit is formed such that the image display apparatus includes headphone portions, and wiring lines for the headphone portions from the image display apparatus extend from the end portions of the modern portions to the headphone portions through the temple portions and the inside of the modern portions. The headphone portions may be, for example, inner ear type headphone portions or canal type headphone portions. More particularly, the wiring lines for the headphone portions are preferably formed such that they extend from the end portions of the modern portions to the headphone portions in such a manner as to go round the rear side of the auricles or ear capsules.

WORKING EXAMPLE 1

Figure 1B:
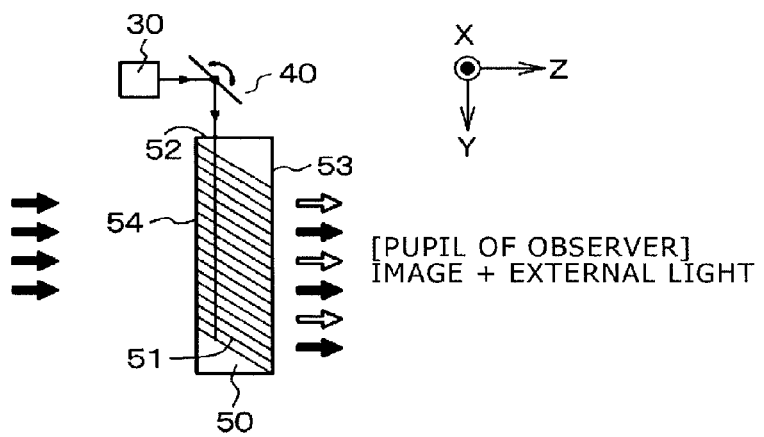
Figure 1C:
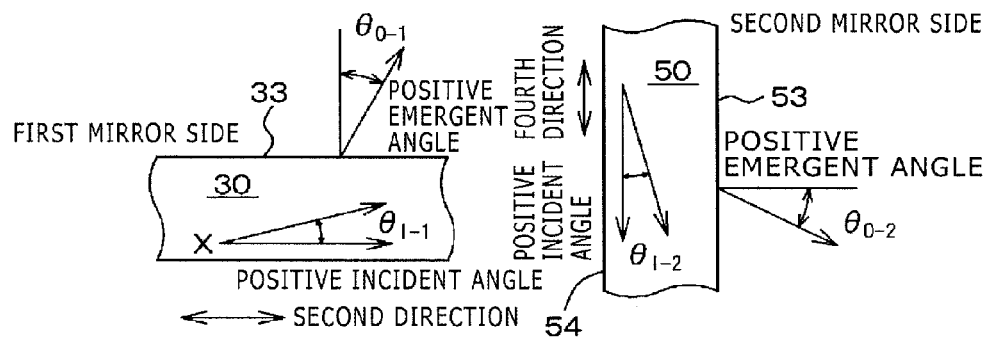
FIG. 1C is a schematic view illustrating an incidence angle and an emergence angle.

The working example 1 relates to an image display apparatus and an optical device according to the first embodiment of the present invention. The image display apparatus of the working example 1 is schematically shown in FIGS. 1A and 1B. In particular, FIG. 1A shows the image display apparatus on a virtual plane, that is, on an XZ plane, including a second direction and a fifth direction. Meanwhile, FIG. 1B shows the image display apparatus on another virtual plane, that is, on a YZ plane taken along line B-B in FIG. 1A and including a fourth direction and the fifth direction. Further, FIG. 1C illustrate an incidence angle and an emergence angle. It is to be noted, however, that a translucent film is omitted in FIG. 1C. Further, it is shown in FIGS. 1A to 1C and FIGS. 2A to 5B that the image display apparatus is disposed such that light is emitted in the positive direction of the Z axis from a first light deflection section 30 and light is emitted in the positive direction of the Y axis, that is, in a downward direction, by a second mirror 40. However, the image display apparatus may otherwise be disposed such that, for example, light is emitted in the negative direction of the Z axis from the first light deflection section 30 and light is emitted in the positive direction of the Y axis, that is, in a downward direction, through reflection by the second mirror 40. It is to be noted that a variation of light path by refraction of light incident to and emergent from the first light deflection section, a second light deflection section and so forth is omitted in the figures.

The image display apparatus 10 of the working example 1 or the working example 3 hereinafter described includes a light source 11 and a scanning section for scanning a light beam emitted from the light source 11. The scanning section includes:

(a) a first mirror 20 mounted for pivotal motion around an axis provided by a first axis 21 extending in a first direction and configured to receive a light beam emitted from the light source 11 and incident thereto;

(b) a first light deflection section 30 having an axis extending along a second direction different from the first direction and configured to receive the light beam emitted from the first mirror 20 and incident at a first incidence angle $\theta_{I-1}$ and emit parallel light at a predetermined first emergence angle $\theta_{0-1}$ with respect to the second direction depending upon the first incidence angle $\theta_{I-1}$ of the light beam by pivotal motion of the first mirror 20;

(c) a second mirror 40 mounted for pivotal motion around an axis provided by a second axis 41 extending in the third direction and configured to receive the parallel light emitted from the first light deflection section 30 and incident thereto; and (d) a second light deflection section 50 having an axis extending along a fourth direction different from the third direction and configured to receive the parallel light emitted from the second mirror 40 and incident at a second incidence angle $\theta_{I\text{-}2}$ thereto and emit the parallel light having a predetermined second emergence angle $\theta_{0\text{-}2}$ with respect the fourth direction depending upon the second incidence angle $\theta_{I\text{-}2}$ of the parallel light by pivotal motion of the second mirror 40.

The second light deflection section 50 has an external light receiving face 54 provided in an opposing relationship to a light emitting face, that is, a second light emitting face 53, provided in parallel to the fourth direction and adapted to receive external light incident thereto. Further, a plurality of translucent films 31 each in the form of a half mirror are provided in the inside of the first light deflection section 30. Meanwhile, a plurality of translucent films 51 each in the form of a half mirror are provided in the inside of the second light deflection section 50.

Further, the optical device of the working example 1 or the working example 3 hereinafter described has:

a light incidence face, that is, a second light receiving face 52, provided in parallel to one direction, that is, to the third direction, and configured to receive light from a light source incident thereto;

a light emitting face, that is, a second light emitting face 53, provided in parallel to an axial line extending in a direction, that is, in the fourth direction, different from the one direction, that is, from the third direction; and an external light receiving face 54 provided in an opposing relationship to the light emergence face, that is, to the second light emitting face 53, and configured to receive external light incident thereto.

Further, the optical device is configured such that, a plurality of translucent films 51 are provided in the inside thereof, that the translucent films 51 are arrayed in parallel to each other along the axial line thereof and in a spaced relationship from each other and are disposed in an inclined relationship to the axial line, and that light from the light source incident to the light incidence face, that is, to the second light receiving face 52, is reflected by the translucent films 51 and emitted from the light emitting face, that is, from the second light emitting face 53 while external light incident from the external light receiving face 54 is emitted from the light emitting face, that is, from the second light emitting face 53.

As seen in FIG. 1C and FIGS. 2A to 5B, it is assumed here that the first emergence angle $\theta_{0\text{-}1}$ of parallel light emitted from the first light deflection section 30 toward a direction away from the first mirror 20 is an emergence angle of a positive value. In this instance, as the first incidence angle $\theta_{I\text{-}1}$ of a light beam to the first light deflection section 30 increases, the first emergence angle $\theta_{0\text{-}1}$ changes its direction from that of a negative value to that of a positive value. Also it is assumed here that the second emergence angle $\theta_{0\text{-}2}$ of parallel light emitted from the second light deflection section 50 toward a direction away from the second mirror 40 is an emergence angle of a positive value. In this instance, as the second incidence angle $\theta_{I\text{-}2}$ of parallel light to the second light deflection section 50 increases, the second emergence angle $\theta_{0\text{-}2}$ changes its direction from that of a negative value to that of a positive value.

It is to be noted that, FIGS. 2A, 3A, 4A and 5A show the image display apparatus on the virtual plane, that is, on the XZ plane, which includes the second direction and the fifth direction similarly to FIG. 1A. Similarly, FIGS. 2B, 3B, 4B and 5B show the image display apparatus on the virtual plane, that is, on the YZ plane, which includes the fourth direction and the fifth direction similarly to FIG. 1B.

An image is formed from an array of totaling P×Q pixels arrayed such that P pixels are arrayed along the second direction and Q pixels are arrayed along the fourth direction. In particular, for example, P=640, Q=480, and the opposite angle is 28 degrees. The first incidence angle $\theta_{I\text{-}1}$ is defined in response to the position of the P pixels along the second direction, and the second incidence angle $\theta_{I\text{-}2}$ is defined in response to the Q pixels along the fourth direction. By emission of a light beam once from the light source 11, one pixel of a display image is obtained finally. Accordingly, in order to display P×Q pixels, it is necessary to emit P×Q light beams. Parallel light emitted from the second light deflection section 50 is incident to an eyeball of an observer, passes through a pupil, which normally has a diameter of approximately 2 to 6 mm, of the eyeball, forms an image on the retina and is recognized as one pixel. The observer can recognize a two-dimensional image for one frame configured from P×Q pixels depending upon a set of such operations, that is, upon the emission of the P×Q light beams from the light source 11.

Figure 2A:
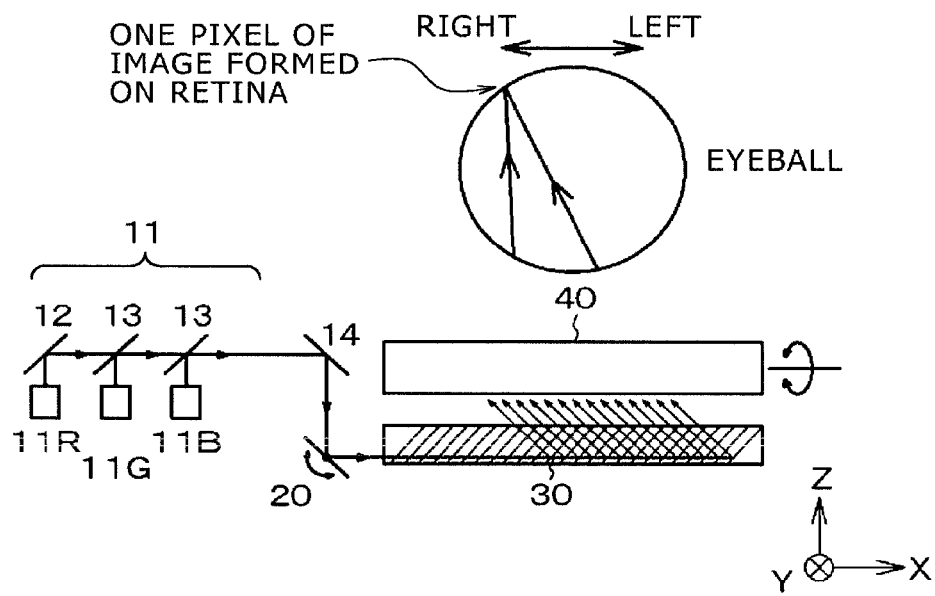
FIGS. 2A and 2B are schematic views illustrating a state of a light beam and parallel light when an observer observes an image and a pixel at a left lower corner of the image forms an image at a right upper portion of the retina.
Figure 2B:
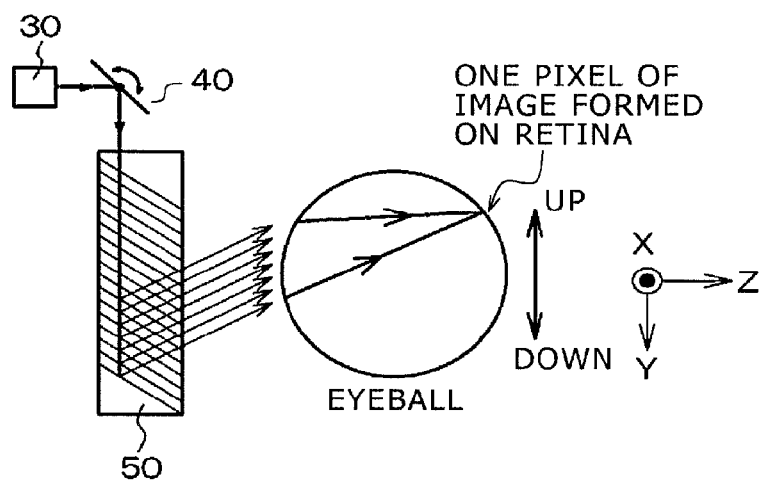
Figure 3A:
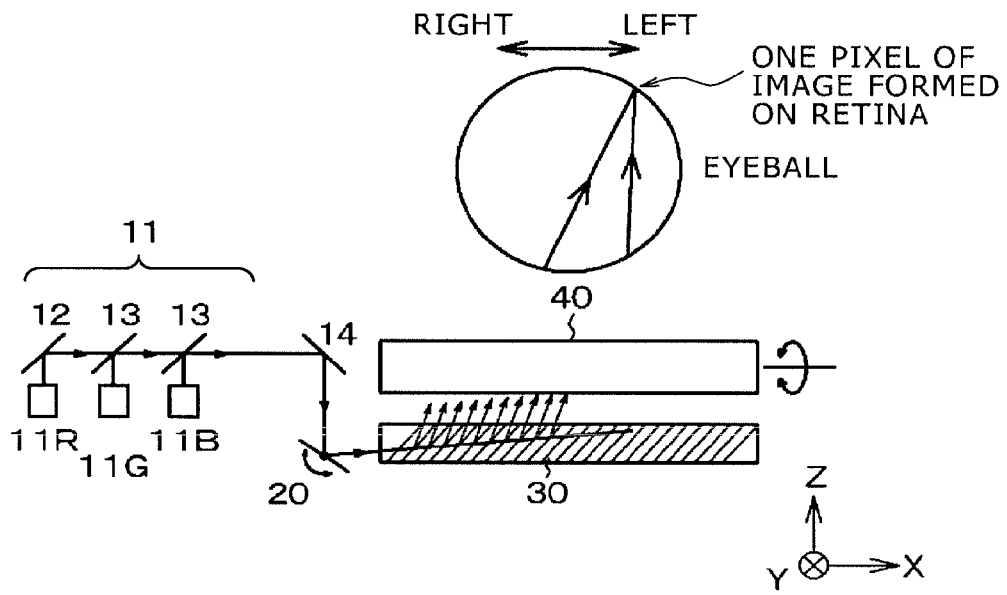
FIGS. 3A and 3B are schematic views illustrating a state of a light beam and parallel light when an observer observes an image and a pixel at a right lower corner of the image forms an image at a left upper portion of the retina.
Figure 3B:
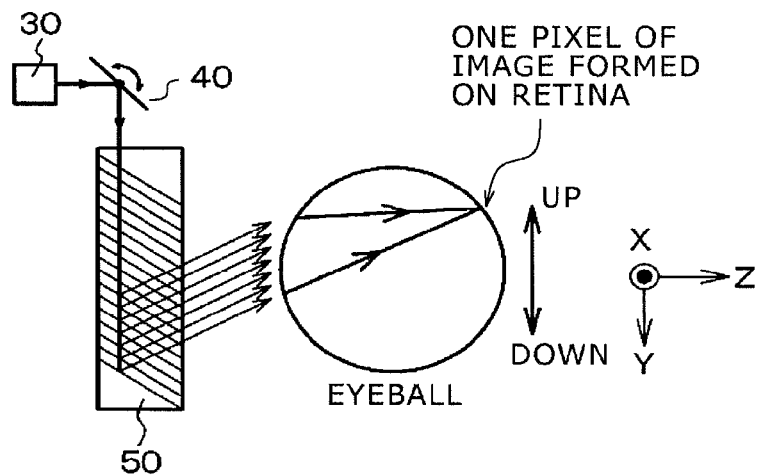
Figure 4A:
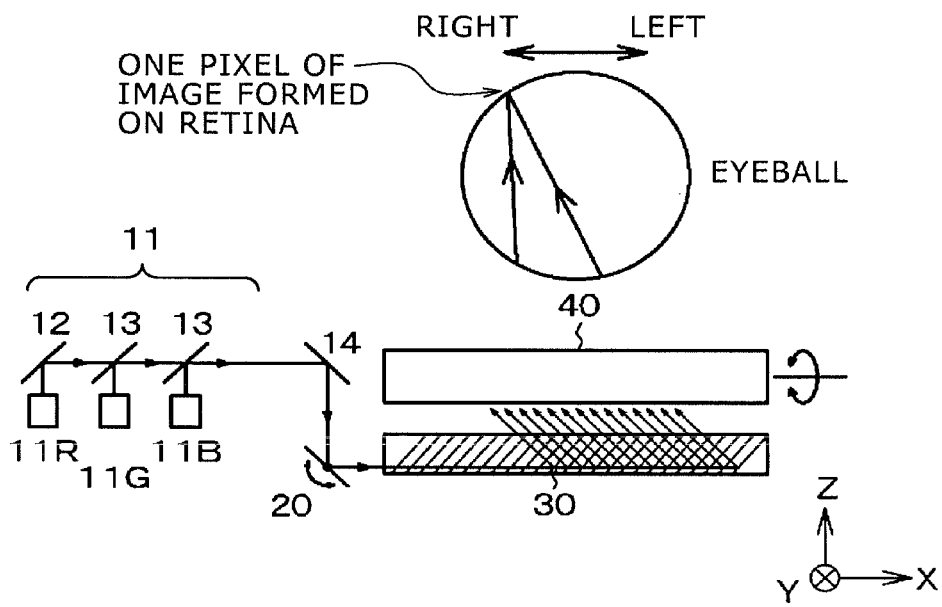
FIGS. 4A and 4B are schematic views illustrating a state of a light beam and parallel light when an observer observes an image and a pixel at a left upper corner of the image forms an image at a right lower portion of the retina.
Figure 4B:
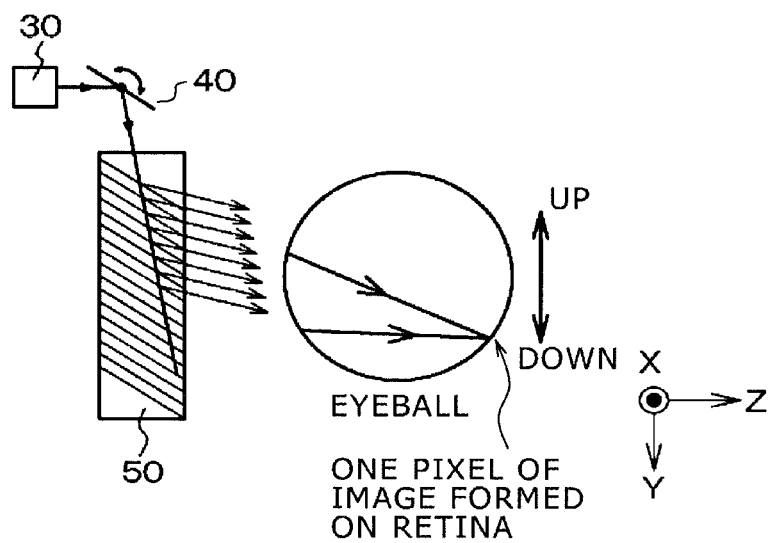
Figure 5A:
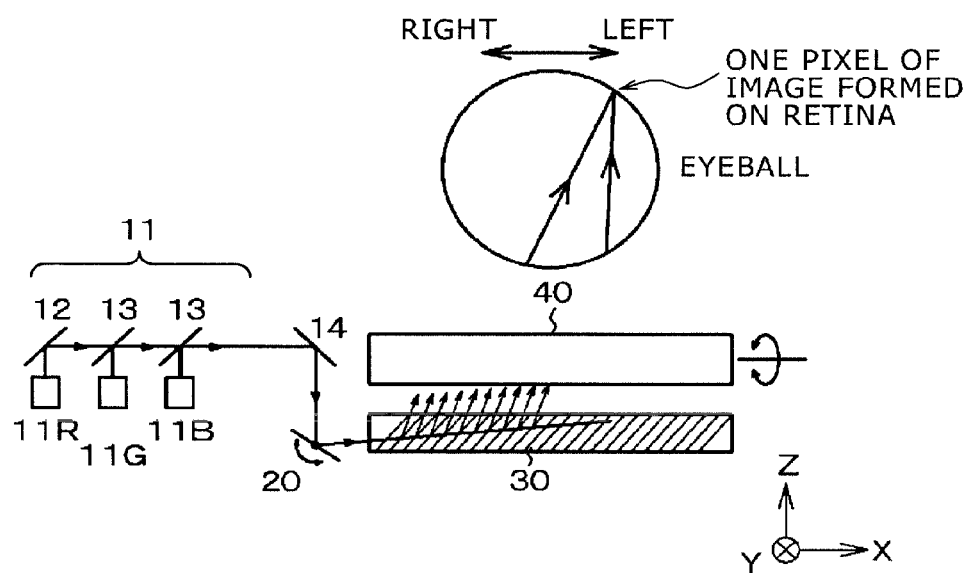
FIGS. 5A and 5B are schematic views illustrating a state of a light beam and parallel light when an observer observes an image and a pixel at a right upper corner of the image forms an image at a left lower portion of the retina.
Figure 5B:
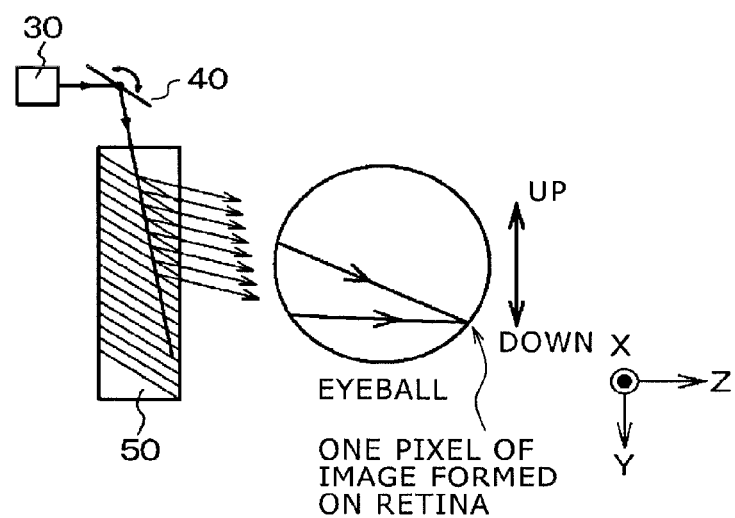

In the state illustrated in FIGS. 2A and 2B, that is, in a "state A," when the observer watches the image, a pixel at a left lower corner of the image forms an image at a right upper portion of the retina. Meanwhile, in the state illustrated in FIGS. 3A and 3B, that is, in a "state B," when the observer watches the image, a pixel at a right lower corner of the image forms an image at a left upper portion of the retina. In the state illustrated in FIGS. 4A and 4B, that is, in a "state C," when the observer watches the image, a pixel at a left upper corner of the image forms an image at a right lower portion of the retina. In the state illustrated in FIGS. 5A and 5B, that is, in a "state D," when the observer watches the image, a pixel at a right upper corner of the image forms an image at a left lower portion of the retina. The first incidence angle $\theta_{I\text{-}1}$, first emergence angle $\theta_{0\text{-}1}$, second incidence angle $\theta_{I\text{-}2}$ and second emergence angle $\theta_{0\text{-}2}$ in the states described are indicated in Table 1 below:

TABLE 1

| | State A | State B | State C | State D |
| --- | --- | --- | --- | --- |
| First incidence angle $\theta_{I\text{-}1}$ | minimum | maximum | minimum | maximum |
| First emergence angle $\theta_{0\text{-}1}$ | minimum | maximum | minimum | maximum |
| Second incidence angle $\theta_{I\text{-}2}$ | minimum | minimum | maximum | maximum |
| Second emergence angle $\theta_{0\text{-}2}$ | minimum | minimum | maximum | maximum |

A light beam incident to the first light deflection section 30 is expanded in the second direction by the first light deflection section 30, and the parallel light incident to the second light deflection section 50 is expanded in the fourth direction by the second light deflection section 50. Consequently, the parallel light obtained finally is in a form expanded two-dimensionally in the second and fourth directions.

The first mirror 20 and the second mirror 40 are configured, for example, from a MEMS having micromirrors mounted for pivotal motion around one axis. It is to be noted that the micromirrors configured from such an MEMS may have a configuration and structure known in the art, and therefore, detailed description of the same is omitted herein. Here, the number of times of pivotal motion, or in other words, the oscillation frequency, of the first mirror 20 per unit time is higher than the number of times of pivotal motion or oscillation frequency of the second mirror 40 per unit time. In particular, the number of times of pivotal motion of the first mirror 20 per unit time is 21 kHz, and the number of times of pivotal motion of the second mirror 40 per unit time is 60 Hz equal to the frame rate. It is to be noted that, while the pivotal motion of the first mirror 20 at a high speed is carried out based on resonance and the pivotal motion of the second mirror 40 at a low speed is carried out based on non-resonance. However, both pivotal motions may otherwise be carried out by resonance driving. Further, the area of the second mirror 40 is greater than that of the first mirror 20 because the light beam is expanded in the second direction by the first light deflection section 30. In particular, the first mirror 20 is sized such that it is 2.0 mm long in the first direction and 2.8 mm long in a direction perpendicular to the first direction such that it has a rectangular shape. Meanwhile, the second mirror 40 is sized such that it is 30 mm long in the third direction and 2.8 mm long in a direction perpendicular to the third direction such that it has a rectangular shape.

In the working example 1, the first and fourth directions coincide with each other or in other words are parallel to each other, and the second and third directions coincide with each other or in other words are parallel to each other. Further, the first and fourth directions and the second and third directions have a relationship orthogonal to each other. Particularly, the image observation point is positioned in the fifth direction with respect to the second light deflection section 50 and the fifth direction is perpendicular to the first direction and the fourth direction and also perpendicular to the second direction and the third direction. More particularly, while the second and third directions are made the X direction and the first and fourth directions are made the Y direction, the fifth direction is made the Z direction. However, the directions may otherwise be different from them, or they may not have such a parallel or orthogonal relationship as described above.

The first light deflection section 30 and the second light deflection section 50 are made of optical glass such as BK7 whose refractive index is 1.5168 at a wavelength of 587.6 nm. Here, the length, height and thickness of the first light deflection section 30, that is, a length $TL_1$ along the second direction, a length $H_1$ along the fourth direction and a length $t_1$ along the fifth direction of the first light deflection section 30, and the length, height and thickness of the second light deflection section 50, that is, a length $TL_2$ along the second direction, a length $H_2$ along the fourth direction and a length $t_2$ along the fifth direction are set as given in Table 2 below. As described hereinabove, the first light deflection section 30 includes a plurality of translucent films 31 each in the form of a half mirror provided therein, and also the second light deflection section 50 has a plurality of translucent films 51 each in the form of a half mirror provided therein. In the working example 1, the pitches $P_1$ and $P_2$ along the second and fourth directions of the translucent films 31 and 51 are set as given below. The translucent films 31 and 51 are formed at an equal pitch. The angle of the translucent films 31 of the first light deflection section 30 with respect to the second direction, that is, the angle $\zeta_1$ of the first light deflection section 30 with respect to the second direction, is equal among all of the translucent films 31. Similarly, also the angle of the second light deflection section 50 with respect to the fourth direction of the translucent films 51, that is, the angle $\zeta_2$ with respect to the fourth direction, is equal among all of the translucent films 51.

TABLE 2

$TL_1$ = 30 mm
$H_1$ = 3.0 mm
$t_1$ = 7.0 mm
$TL_2$ = 30 mm
$H_2$ = 30 mm
$t_2$ = 5.0 mm
$P_1$ = 0.75 mm
$\zeta_1$ = 49.0 degrees
$P_2$ = 0.75 mm
$\zeta_2$ = 47.5 degrees The first light deflection section 30 and the second light deflection section 50 can be produced in the following manner. In particular, a translucent film 31 or 51 is formed on the surface of an optical glass plate having a predetermined thickness by EB (Electron Beam) vapor deposition, and such resulting materials are adhered to and laminated on each other. Then, the laminate is cut and polished such that the translucent films 31 or 51 may have a desired angle $\zeta_1$ or $\zeta_2$ with respect to the second or fourth direction.

In the working example 1, the light source 11 is configured from a semiconductor laser device (LD). In particular, the light source 11 is configured from a light emitting element 11R in the form of a semiconductor laser device for emitting red light, a light emitting element 11G in the form of a semiconductor laser element for emitting green light and a light emitting element 11B in the form of a semiconductor element for emitting blue light. A light beam of red, another light beam of green and a further light beam of blue emitted from the light emitting elements 11R, 11G and 11B are multiplexed into a single light beam by a multiplexing unit or light synthesis unit. The multiplexing unit is configured particularly from dichroic prisms 13. It is to be noted that reference numerals 12 and 14 denote each a reflecting mirror. While a light beam shaping unit in the form of a collimate lens for converting a light beam emitted from the light source 11 into a parallel light beam is disposed between the light source 11 and the fixed mirror 14, the collimate lens is omitted in the drawings. Further, an aperture not shown for shaping the sectional shape of the light beam is provided between the light source 11 and the fixed mirror 14. The aperture has a circular shape of a diameter of 1.0 mm. Accordingly, the sectional area of the light beam when one light beam is incident to the first mirror 20 is $7.9 \times 10^{-3}$ cm$^2$.

It is to be noted that an anti-reflection film may be disposed or formed on a first light receiving face 32 and a first light emitting face 33 of the first light deflection section 30. Further, an anti-reflection film may be disposed or formed on the second light receiving face 52 and the second light emitting face 53 of the second light deflection section 50 and the external light receiving face 54 of the second light deflection section 50 which opposes to the second light emitting face 53. Here, the anti-reflection films (ARC) are configured, for example, from a laminate film of $MgF_2$ and $Si_3N_4$.

Figure 11:
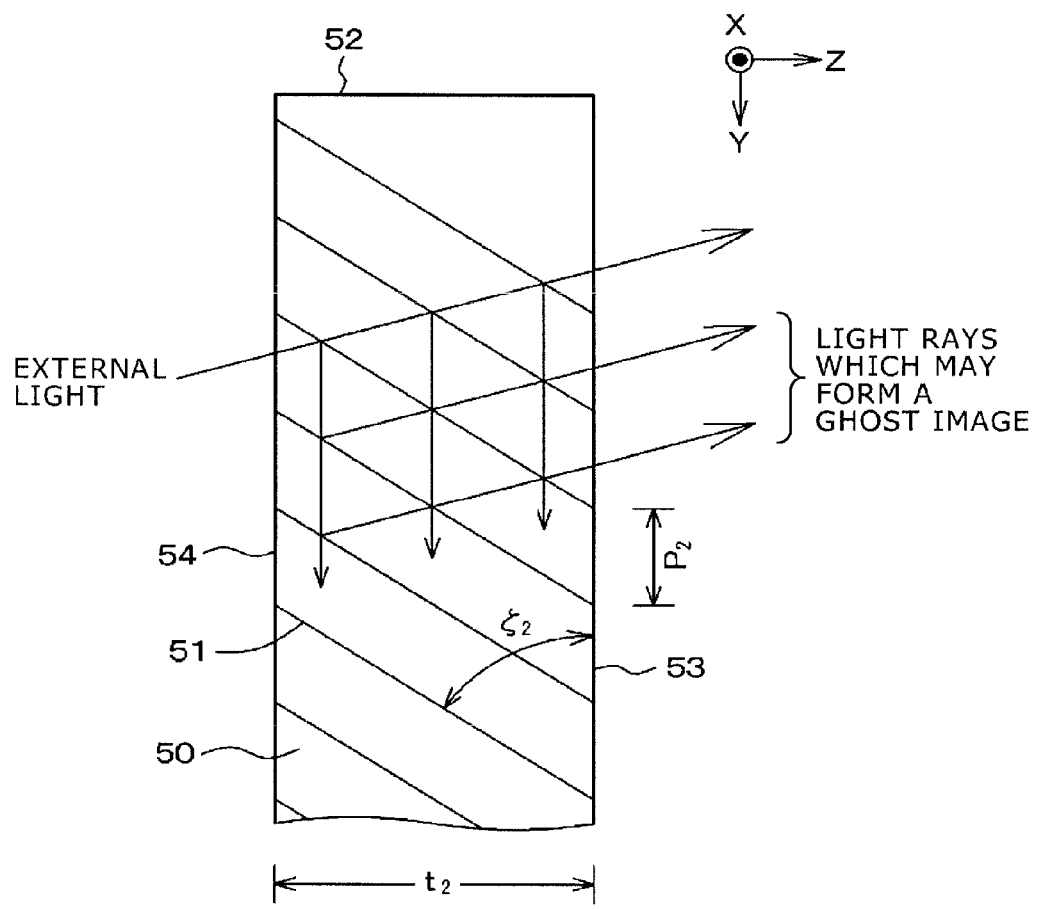
FIG. 11 is a schematic view illustrating a state in which a ghost image appears when a light beam incident to first light deflection means from a first mirror is totally reflected by a first light emitting face of the first light deflection means.

Incidentally, as seen in a schematic sectional view of FIG. 11, part of light incident to the second light deflection section 50 from the external light receiving face 54 passes through one of the translucent films 51 and is emitted from the second light emitting face 53. Meanwhile, the remaining part of the external light is reflected by the translucent film 51. Such external light is hereinafter referred to as "reflected external light" for the convenience of description. The reflected external light comes upon a different one of the translucent films 51. Part of such reflected external light is reflected by the different translucent film 51 and emitted to the outside. Such reflected external light emitted from the translucent films 51 will form a ghost image.

In the working example 1, where the array pitch of the translucent films, that is, of the translucent films 51, which configure the second light deflection section 50, is represented by $P_2$, the thickness of the second light deflection section 50 by $t_2$ and the angle of the translucent films 51 with respect to the second light emitting face 53 by $\zeta_2$ and k is a constant higher than 0 but lower than 1, the light reflectivity $R_2$ of the translucent films with regard to the wavelength of the light beam satisfies $$R_2 \leq k \times \{(P_2/t_2) \times \tan(\zeta_2)\}^{1/2} \quad (1).$$

Or, in the working example 1, where the array pitch of the translucent films 51 is represented by P (hereinafter referred to as "pitch $P_2$"), the thickness of the optical device by t (hereinafter referred to as "thickness $t_2$") and the angle of the translucent films 51 with respect to the light emitting face by $\zeta$ hereinafter referred to as "angle $\zeta_2$") and k is a constant higher than 0 but lower than 1, the light reflectivity R (hereinafter referred to as "light reflectivity $R_2$") of the translucent films with regard to the wavelength of the light from the light source satisfies $$R \leq k \times \{(P/t) \times \tan(\zeta)\}^{1/2} \quad (2).$$

It is to be noted that, while, in the expressions (1) and (2), the entire second term of the right side is reduced to the power of ½, this is because the external light which may cause ghosting is reflected twice by the translucent films 51 as seen in FIG. 11.

In the working example 1, more particularly the value of the constant k is set to k=0.1. Further, since $P_2$=0.75 mm $t_2$=5.0 mm $\zeta_2$=47.5 degrees as indicated in Table 2 above, $$R_2 \leq 0.1 \times \{(0.75/5.0) \times \tan(47.5)\}^{1/2} = 0.040$$

is satisfied.

In the working example 1, in order to obtain the translucent films 51 for achieving the light reflectivity of $R_2$=4.0% at the wavelength 530 nm, a translucent film of a thickness 150 nm made of $MgF_2$ is used. It is to be noted that, while also the translucent films 31 which configure the first light deflection section 30 is configured similarly in order to simplify fabrication, the translucent films 31 of the first light deflection section 30 are not limited to those which satisfy the expression (1) given hereinabove.

By setting the light reflectivity $R_2$ of the translucent films 51, for example, to 4.0% in this manner, the light intensity of a ghost from the second light deflection section 50 can finally be made approximately equal to 1% of the light intensity of the external light incident to the second light deflection section 50. Consequently, occurrence of ghosting arising from incidence of external light to the second light deflection section 50 can be suppressed. Consequently, the light intensity of the external light which is incident to the second light deflection section 50 from the external light receiving face 54, comes to and is reflected by a translucent film 51, comes to and is reflected by another translucent film 51, and to be emitted from the second light emitting face 53 can be reduced. As a result, occurrence of ghosting can be suppressed.

Besides, the image display apparatus of the working example 1 includes the first mirror 20, first light deflection section 30, second mirror 40 and second light deflection section 50 and emits a light beam emitted from the light source 11 as parallel light. Accordingly, there is no necessity to produce, for example, a two-dimensional image once as an intermediate image in the inside of the scanning section. Further, an image forming apparatus itself configured, for example, from a liquid crystal display apparatus is unnecessary. Therefore, reduction in size of the light source or the scanning section and besides reduction in size and weight as the image display apparatus can be anticipated.

It is to be noted that each translucent film 51 may be configured such that it reflects one of an S polarized light component and a P polarized light component and passes the other one of the S and P polarized light components therethrough. In particular, for example, each translucent film 51 may be configured such that it reflects an S polarized light component and passes a P polarized light component therethrough. More particularly, each translucent film 51 is formed as a translucent film of 40 nm thick made of $MgF_2$. Further, in place of disposition or formation of an antireflection film on the external light receiving face 54, the second light receiving face 52 may be configured such that, on the external light receiving face 54 side, more particularly on the external light receiving face 54, a polarizing element for passing the other polarized light component, that is, a P polarized light component, therethrough, more particularly a film formed by drawing dyed polyvinyl alcohol, is provided. The extinction ratio of such a polarizing element as just described is, for example, 10. Consequently, the external light which is incident to the second light deflection section 50 from the external light receiving face 54 has a P polarized light component. Thus, if this external light comes to a translucent film 51, then the translucent film 51 reflects the S polarized light component while it passes the P polarized light component therethrough. Therefore, the external light is transmitted through the translucent film 51 without being reflected by the translucent film 51. Accordingly, occurrence of ghosting arising from incidence of external light to the second light deflection section 50 can be suppressed with a higher degree of certainty.

WORKING EXAMPLE 2

Figure 6:
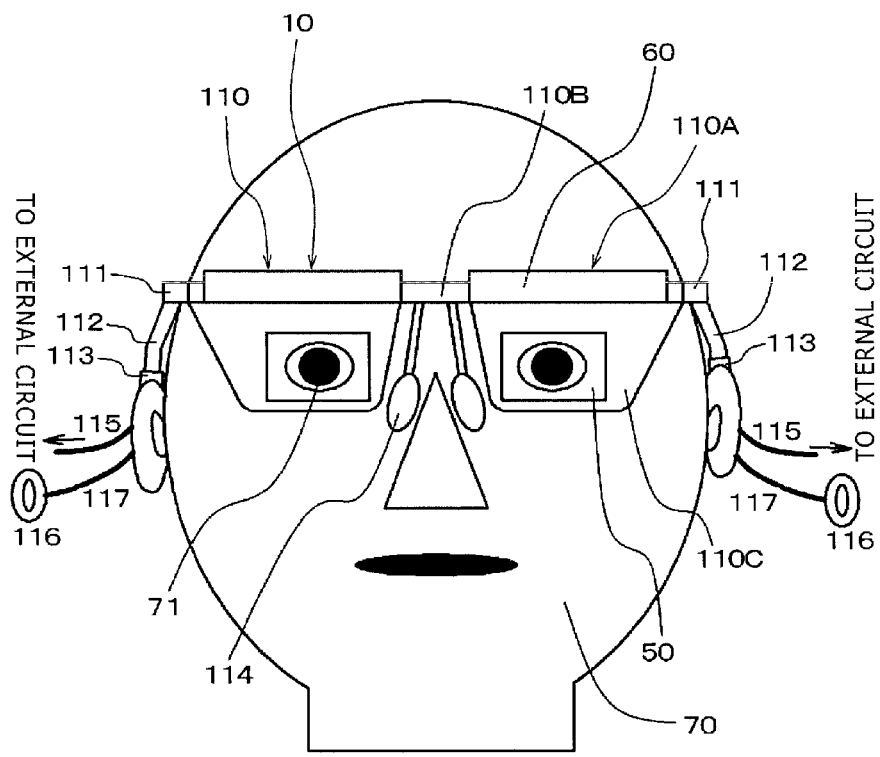
FIG. 6 is a schematic view of a head-mounted display unit of a working example 2 as viewed from the front.
Figure 7:
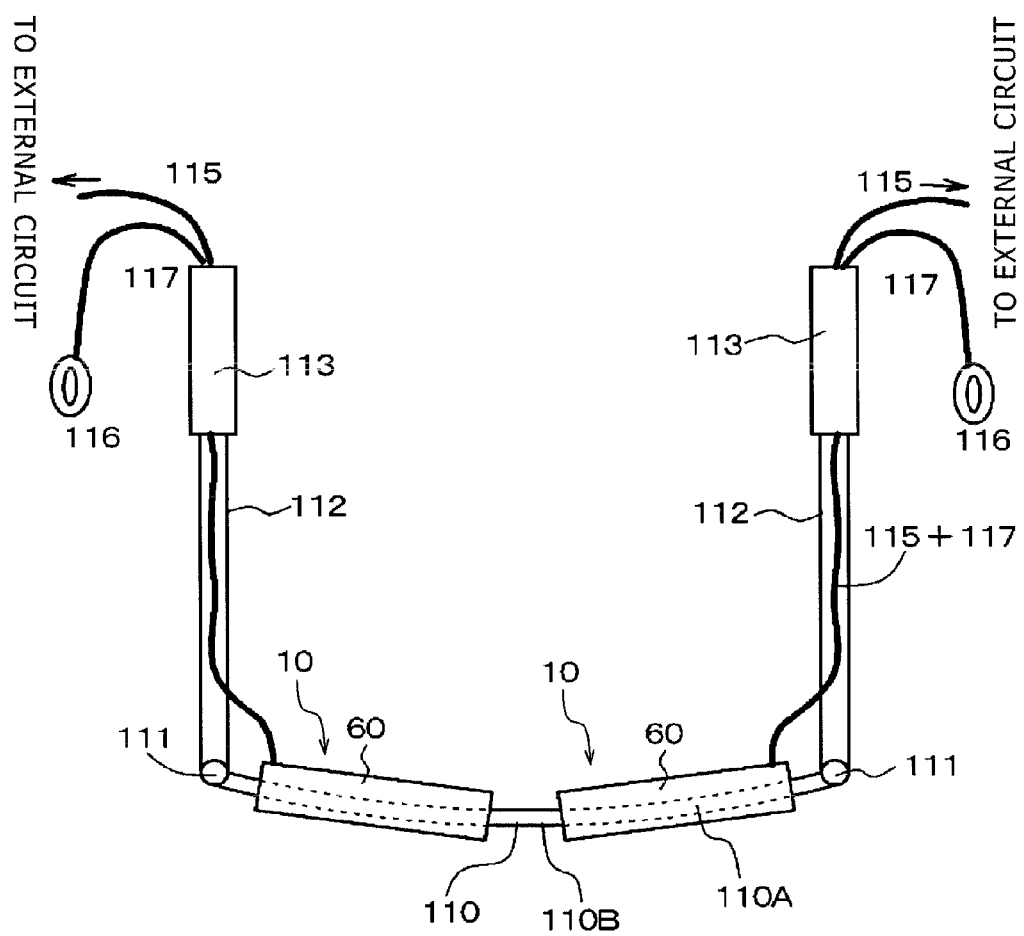
FIG. 7 is a schematic view of the head-mounted display unit of the working example 2 as viewed from above.

The working example 2 relates to a head-mounted display (HMD) unit according to the first embodiment of the present invention. In particular, the working example 2 relates to a head-mounted display (HMD) unit which incorporates the image display apparatus according to the first embodiment of the present invention, particularly the image display apparatus 10 described hereinabove in the description of the working example 1. A schematic view of the head-mounted display unit of the working example 2 as viewed from the front is shown in FIG. 6. Further, a schematic view of the head-mounted display unit of the working example 2 as viewed from above is shown in FIG. 7.

The head-mounted display unit of the working example 2 includes (A) a frame 110 of the eyeglasses type for being mounted on the head of an observer 70, and (B) an image display apparatus 10.

It is to be noted that the head-mounted display unit in the working example 2 is formed as an apparatus of the binocular type including two image display apparatus 10.

The frame 110 includes a front portion 110A disposed in front of the observer 70, two temple portions 112 attached for pivotal motion to the opposite ends of the front portion 110A through hinges 111, and modern portions 113 also called end cells or ear pads individually attached to end portions of the temple portions 112. Further, a light source 11, a first mirror 20, a first light deflection section 30 and a second mirror 40 are disposed at an upper portion of the front portion 110A, and a second light deflection section 50 is disposed in an opposing relationship to each of the pupils 71 of the observer 70. In particular, the second light deflection section 50 is attached to each of attaching members 110C formed from a transparent glass plate and disposed at positions corresponding to lens attaching positions of a frame of ordinary eyeglasses. It is to be noted that the light source 11, first mirror 20, first light deflection section 30 and second mirror 40 are accommodated in each of housings 60 and are not shown in FIGS. 6 and 7. Further, nose pads 114 are attached to the front portion 110A. It is to be noted that, in FIG. 7, the nose pad 114 is not shown. The frame 110 is made of a metal or plastic.

Further, wiring lines 115 such as signal lines, power supply lines and so forth extend from the image display apparatus 10. The wiring lines 115 extend through the inside of the temple portions 112 and the modern portions 113 to the outside from the end portions of the modern portions 113 and are connected to an external circuit not shown. Further, each of the image display apparatus 10 includes a headphone portion 116, and headphone portion wiring lines 117 extending from the individual image display apparatus 10 extend from the end portions of the modern portions 113 to the headphone portions 116 through the inside of the temple portions 112 and the inside of the modern portions 113. More particularly, the headphone portion wiring lines 117 extend from the end portions of the modern portions 113 to the headphone portions 116 in such a manner as to go round the rear side of the auricles or ear capsules. By using such a configuration as just described, the head-mounted display unit can be formed clear-cut without giving such an impression that the headphone portions 116 and/or the headphone portion wiring lines 117 are disposed disorderly.

WORKING EXAMPLE 3

The working example 3 relates to an image display apparatus, an optical device and a head-mounted display unit according to the second embodiment of the present invention.

In the image display apparatus or the head-mounted display unit of the working example 3, a plurality of translucent films 51 are provided in the inside of a second light deflection section 50 similarly as in the working example 1 or the working example 2. Further, in the working example 3, the light reflectivity of the translucent films 51 in a wavelength band other than the wavelength of a light beam is lower than that at the frequency of the light beam. Further, in the optical device of the working example 3, the light reflectivity of the translucent films 51 in the wavelength band other than the wavelength of the light from the light source is lower than that at the wavelength of the light from the light source.

Figure 12:
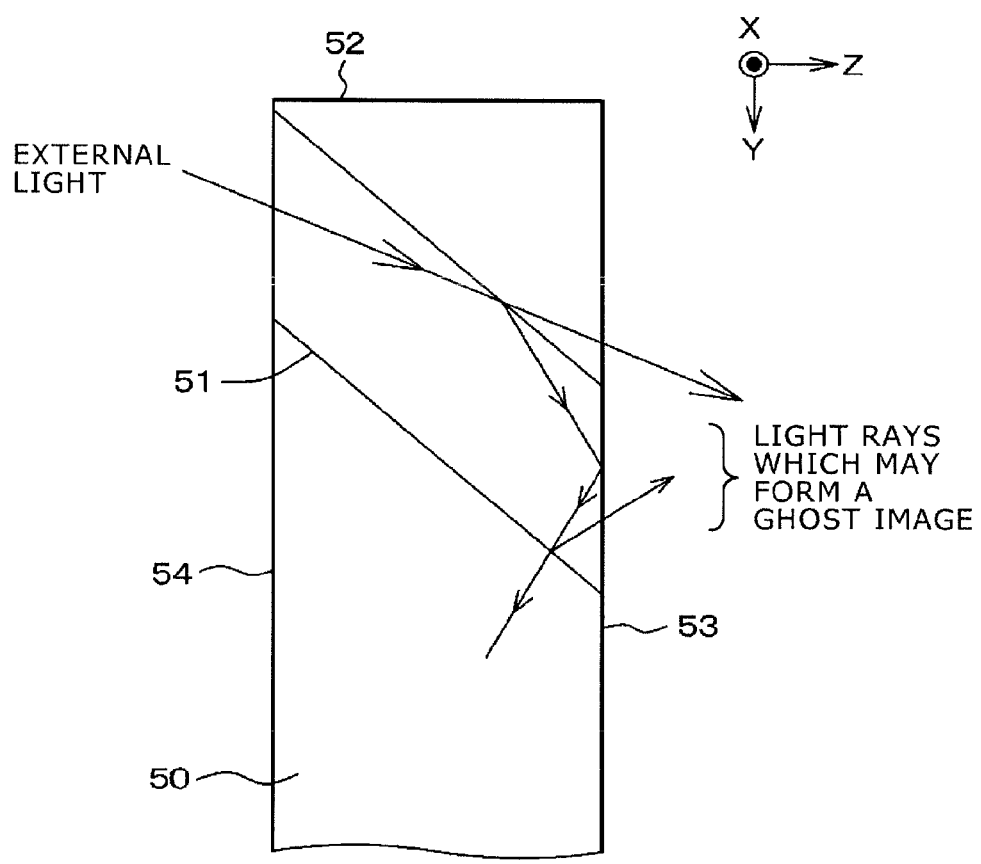
FIG. 12 is a schematic view illustrating another state in which a ghost image appears when a light beam incident to the first light deflection means from the first mirror is totally reflected by the first light emitting face of the first light deflection means.

Incidentally, part of external light incident to the second light deflection section 50 from the external light receiving face 54 passes through a translucent film 51 and is emitted from the second light emitting face 53. On the other hand, as seen in a schematic sectional view shown in FIG. 12 in addition to a schematic sectional view shown in FIG. 11, the remaining part of the external light which is reflected by a translucent film 51 may be totally reflected by the second light emitting face 53 and returned to the inside of the second light deflection section 50 until it comes to a different translucent film 51. Part of such totally reflected external light passes through the different translucent film 51 and is emitted to the outside. Meanwhile, the remaining part of such totally reflected external light is reflected by the different translucent film 51 and emitted from the second light emitting face 53, thereby to give rise to ghosting.

In the working example 3, the wavelength band other than the wavelength of the light beam or the light from the light source is defined as a wavelength band equal to or longer than 420 nm but equal to or shorter than 680 nm except wavelengths within a range from $\lambda_0-20$ to $\lambda_0+20$ where $\lambda_0$ is a peak wavelength of the light beam or the light from the light source. The unit of the peak wavelength is nm. In particular, the light source 11 is configured from a light emitting element 11R, a light emitting element 11G and a light emitting element 11B each in the form of a semiconductor laser element. The light emitting element 11R emits light of red whose wavelength $\lambda_0(R)$ is $\lambda_0(R)=620$ nm;

the light emitting element 11G emits light of green whose wavelength $\lambda_0(G)$ is $\lambda_0(G)=530$ nm; and the light emitting element 11B emits light of blue whose wavelength $\lambda_0(B)$ is $\lambda_0(B)=460$ nm. Accordingly, the wavelength band other than the wavelengths of the light beam or the light from the light source is 420 nm to 440 m, 480 nm to 510 nm, 550 nm to 600 nm and 640 nm to 680 nm. Then, the light reflectivity average value $R_{WB-ave}$ in the wavelength band other than the wavelength of the light beam or the light from the light source is lower than the light reflectivity average value $R_{LS-ave}$ within the range from $\lambda_0-20$ to $\lambda_0+20$. More particularly, the light reflectivity average value $R_{WB-ave}$ described is lower than the light reflectivity average value $R_{LS-ave}$ (R) within the range from 440 nm to 480 nm, the light reflectivity average value $R_{LS-ave}(G)$ within the range from 510 nm to 550 nm, and the light reflectivity average value $R_{LS-ave}(R)$ within the range from 600 nm to 640 nm.

In particular, in the working example 3, the translucent films 31 and 51 are configured from a dielectric multilayer film. More particularly, the translucent films 31 and 51 are formed by alternately laminating a $MgF_2$ film of a thickness of 120 nm having a refractive index of 1.38 and a $Si_3N_4$ film of another thickness of 190 nm having another refractive index of 2.00 into nine layers. A graph illustrating a wavelength dependency of the light reflectivity of such a translucent film as just described is illustrated in FIG. 8.

Figure 8:
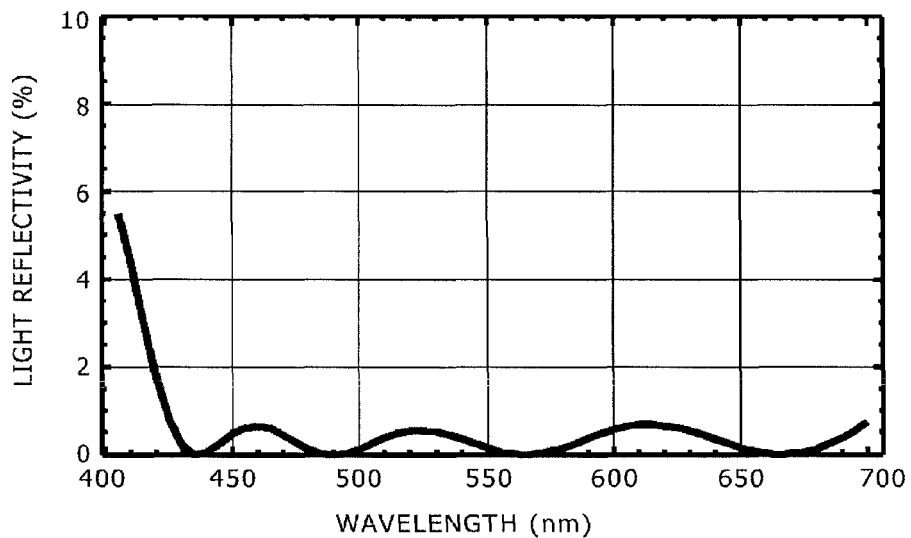
FIG. 8 is a graph illustrating a wavelength dependency of a light reflectivity of a translucent film which configures second light deflection means in a working example 3.

Here, the light reflectivity average value $R_{WB-ave}$ ave of the light reflectivity illustrated in FIG. 8 in the wavelength band described above is $$R_{WB-ave}=0.001\ (0.1\%).$$

On the other hand, an average value $R_{LS-ave}$ of the light reflectivity average values $R_{LS-ave}(R), R_{LS-ave}(G)$ and $R_{LS-ave}(B)$ is $$R_{LS-ave}=0.005\ (0.5\%).$$

Therefore, $$R_{WB-ave}/R_{LS-ave}=0.2.$$

For example, the second light deflection section 50 in which translucent films having a light reflectivity average value of 0.01 (1%) in the wavelength band equal to or longer than 420 nm but equal to or shorter than 680 nm are provided and the second light deflection section 50 in which the translucent films 51 in the working example 3 are provided are compared with each other. In this instance, since external light which may cause ghosting is reflected twice by the translucent films 51 as described hereinabove in the description of the working example 1, the light intensity of the ghost is, for example, in the wavelength band other than the wavelength of the light beam or light from the light source, $$(R_{WB-ave})^2/(0.01)^2=0.01.$$

Thus, by providing the translucent films 51 in the working example 3 in the second light deflection section 50, sufficient reduction of the light intensity of a ghost can be achieved.

In this manner, in the working example 3, the light reflectivity of the translucent films in the second light deflection section in the wavelength band other than the wavelength of the light beam or the light of the light source is lower than that of the wavelength of the light beam or the light from the light source. Accordingly, the reflection of external light when the external light is incident from the external light receiving face, comes to and is reflected by a translucent film and then comes to and is reflected by another translucent film can be reduced. As a result, occurrence of ghosting can be suppressed.

It is to be noted that, except that the translucent films are different in configuration and structure, the configuration and structure of the optical device, image display apparatus and head-mounted display unit of the working example 3 can be made similar to the configuration and the structure of the optical devices, image display apparatus and head-mounted display units described hereinabove in connection with the working example 1 and the modification to the working example 1 which includes a light polarizing unit as well as the working example 2. Therefore, detailed description of them is omitted herein to avoid redundancy. The reflection factor of the translucent films 31 which configure the first light deflection section 30 may be similar to that of the translucent films 51 which configure the second light deflection section 50 or may have a fixed value without depending upon the wavelength.

Figure 9:
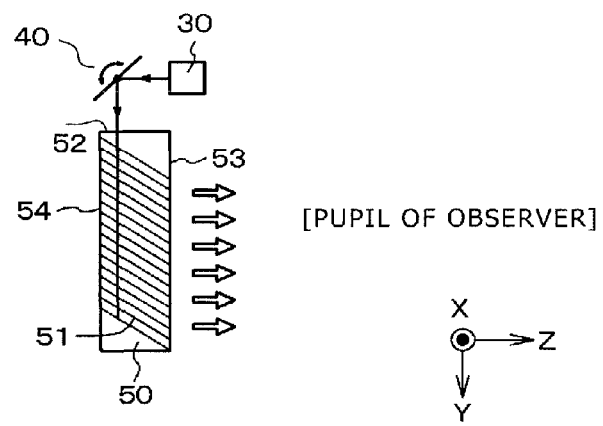
FIG. 9 is a schematic view showing a modification to the image display apparatus of the working example 1.
Figure 10:
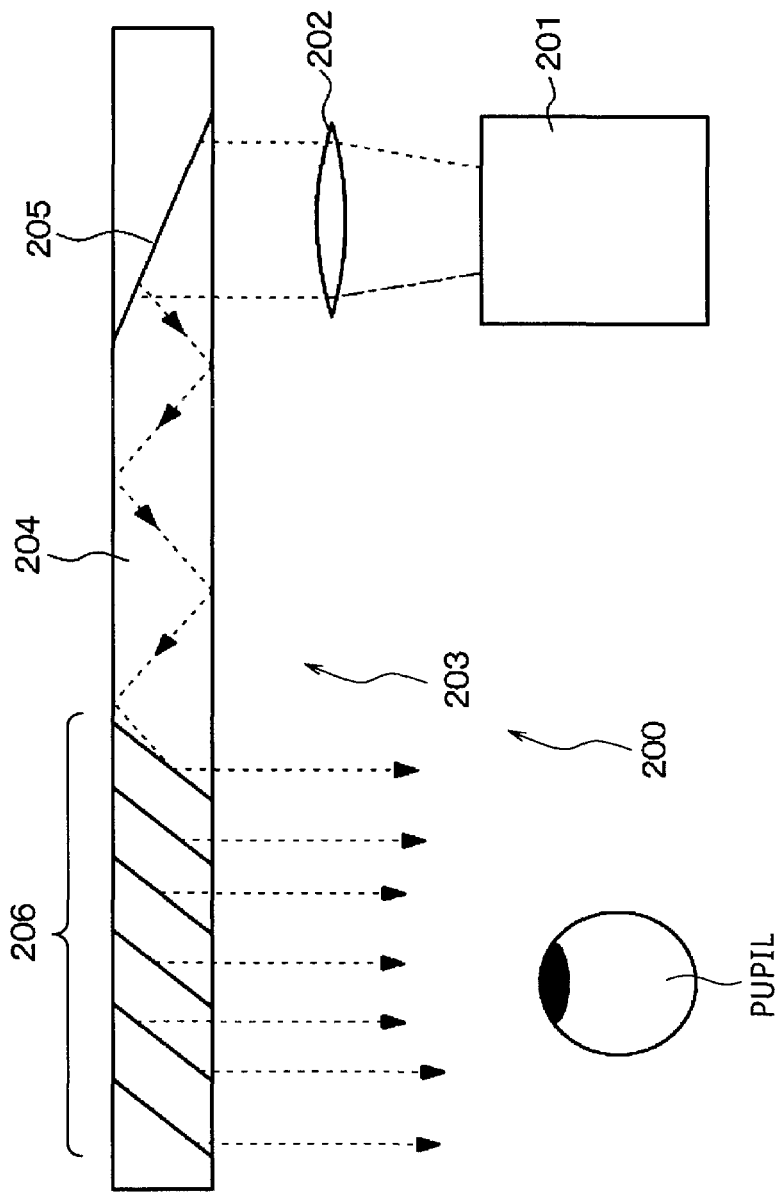
FIG. 10 is a schematic view showing an image display apparatus of a related art.

While the present invention is described above based on the preferred working examples thereof, the present invention is not limited to the working examples. The configuration and the structure of the image display apparatus, optical devices and head-mounted display units described in connection with the working examples are illustrative and can be altered suitably. While, in the working examples, the head-mounted display unit is of the binocular type which includes two image display apparatus, alternatively it may be formed as that of the monocular type which includes a single image display apparatus. Further, the light source may be configured from a single kind of light emitting element such as, for example, a light emitting element which emits light of red, another light emitting element which emits light of green or a further light emitting element which emits light of blue. Further, a light source may be provided in a temple portion of the head-mounted display unit, or a first mirror, a first light deflection section, a second mirror and a second light deflection section may be disposed at an upper portion of a front portion of the head-mounted display unit. While, in the working example, a large number of translucent films have an equal light transmission factor, the light transmission factor may be made different depending upon the arrangement position in the inside of the first light deflection section or the second light deflection section. In particular, for example, in the first light deflection section, the light reflectivity of a translucent film positioned spaced away from the first mirror is set comparatively high, but in the second light deflection section, the light reflectivity of a translucent film positioned spaced away from the second mirror is set comparatively high. In other words, in the first light deflection section, the light transmission factor of a translucent film positioned spaced away from the first mirror is set comparatively low, but in the second light deflection section, the transmission factor of a translucent film positioned spaced away from the second mirror is set comparatively low. More specifically, for example, the value of the light reflectivity of a translucent film positioned at the farthest position from the first or second mirror is set to 1.1 to five times the value of the light reflectivity of another translucent film which is positioned adjacent the first or second mirror. While, in the working examples, light is emitted in the positive direction of the Z axis from the first light deflection section 30 and is emitted in the positive direction of the Y axis, that is, in the downward direction, by the second mirror 40. However, the arrangement of the first light deflection section 30 and the second mirror 40 is not limited this, but they may otherwise be arranged such that, for example, light is emitted in the negative direction of the Z axis from the first light deflection section 30 and is emitted in the positive direction of the Y axis, that is, in the downward direction, by the second mirror 40 as seen in FIG. 9.

It is to be noted that also it is possible to configure a light beam expansion apparatus from the scanning section in the embodiments of the present invention. In particular, a light beam expansion apparatus for expanding a light beam emitted from a light source two-dimensionally in a second direction and a fourth direction and emitting the light beam as parallel light includes (a) a first mirror mounted for pivotal motion around a pivotal motion axis thereof provided by a first axis extending in a first direction and adapted to receive the light beam emitted from the light source and incident thereto;

(b) a first light deflection section having an axial line extending along a second direction different from the first direction and adapted to receive the light beam emitted from the first mirror and incident thereto at a first incidence angle and emit parallel light at a predetermined first emergence angle with respect to the second direction depending upon the first incidence angle of the light beam by the pivotal motion of the first mirror;

(c) a second mirror mounted for pivotal motion around a pivotal motion axis thereof provided by a second axis extending in a third direction and adapted to receive the parallel light emitted from the first light deflection section and incident thereto; and (d) a second light deflection section having an axial line extending along a fourth direction different from the third direction and adapted to receive the parallel light emitted from the second mirror and incident thereto at a second incidence angle and emit parallel light at a predetermined second emergence angle with respect to the fourth direction depending upon the second incidence angle of the parallel light by the pivotal motion of the second mirror.

Further, in the light beam expansion apparatus, the second light deflection section is provided in an opposing relationship to a light emitting face provided in parallel to the fourth direction and adapted to receive external light incident thereto, and a plurality of translucent films are provided in the inside of the second light deflection section similarly as in the first embodiment of the present invention. Or, the light reflectivity of the translucent films in the wavelength band other than the wavelength of the light beam is lower than that at the wavelength of the light beam similarly as in the second embodiment of the present invention.

The present disclosure contains subject matter related to that disclosed in Japanese Priority Patent Application JP 2010-144453 filed in the Japan Patent Office on Jun. 25, 2010, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An image display apparatus, comprising:
a light source; and
scanning means for scanning a light beam emitted from said light source;
said scanning means including
(a) a first mirror mounted for pivotal motion around a pivotal motion axis thereof provided by a first axis extending in a first direction and adapted to receive the light beam emitted from said light source and incident thereto,
(b) first light deflection means having an axial line extending along a second direction different from the first direction for receiving the light beam emitted from said first mirror and incident thereto at a first incidence angle and emitting parallel light at a predetermined first emergence angle with respect to the second direction depending upon the first incidence angle of the light beam by the pivotal motion of said first mirror,
(c) a second mirror mounted for pivotal motion around a pivotal motion axis thereof provided by a second axis extending in a third direction and adapted to receive the parallel light emitted from said first light deflection means and incident thereto, and
(d) second light deflection means having an axial line extending along a fourth direction different from the third direction for receiving the parallel light emitted from said second mirror and incident thereto at a second incidence angle and emitting parallel light at a predetermined second emergence angle with respect to the fourth direction depending upon the second incidence angle of the parallel light by the pivotal motion of said second mirror;
said second light deflection means including an external light receiving face provided in an opposed relationship to a light emitting face provided in parallel to the fourth direction for receiving external light incident thereto;
said second light deflection means having a plurality of translucent films provided in the inside thereof;
a light reflectivity of each of said translucent films in a wavelength band other than the wavelength of the light beam being lower than that at the wavelength of the light beam.

2. The image display apparatus according to claim 1, wherein, when a peak wavelength of the light beam is $\lambda_0$ whose unit is nm, the wavelength band other than the wavelength of the light beam is defined as a wavelength band from 420 nm or more to 680 nm or less except for a wavelength within a range from $\lambda_0-20$ to $\lambda_0+20$; and
a light reflectivity average value $R_{WB\text{-}ave}$ in the wavelength band other than the wavelength of the light beam is lower than a light reflectivity average value $R_{LS\text{-}ave}$ within the range from $\lambda_0-20$ to $\lambda_0+20$.

3. The image display apparatus according to claim 2, wherein the following expression is satisfied:

$$0.05 \leq R_{WB\text{-}ave}/R_{LS\text{-}ave} \leq 0.5.$$

4. The image display apparatus according to claim 1, wherein the light reflectivity at the wavelength of the light beam is 5% or less.

5. The image display apparatus according to claim 1, wherein each of said translucent films reflects one of an S polarized light component and a P polarized light component but passes the other of the polarized light components therethrough; and
said image display apparatus further comprising
polarization means provided on the external light receiving face side for passing the other of the polarized light components therethrough.

6. An image display apparatus, comprising:
a light source; and
scanning means for scanning a light beam emitted from said light source;
said scanning means including
first light deflection means for receiving the light beam incident thereto and emitting parallel light; and
second light deflection means for receiving the parallel light incident thereto and emitting the parallel light;
said second light deflection means having a plurality of translucent films provided in the inside thereof;
a light reflectivity regarding each of said translucent films in the wavelength band other than the wavelength of the light beam being lower than that at the wavelength of the light beam.

7. A head-mounted display unit, comprising:
(A) a frame of the eyeglasses type adapted to be mounted on the head of an observer; and
(B) an image display apparatus attached to said frame;
said image display apparatus including a light source and scanning means for scanning light beam emitted from said light source;
the scanning means including
(a) a first mirror mounted for pivotal motion around a pivotal motion axis thereof provided by a first axis extending in a first direction and adapted to receive the light beam emitted from said light source and incident thereto,
(b) first light deflection means having an axial line extending along a second direction different from the first direction for receiving the light beam emitted from said first mirror and incident thereto at a first incidence angle and emitting parallel light at a predetermined first emergence angle with respect to the second direction depending upon the first incidence angle of the light beam by the pivotal motion of said first mirror,
(c) a second mirror mounted for pivotal motion around a pivotal motion axis thereof provided by a second axis extending in a third direction and adapted to receive the parallel light emitted from said first light deflection means and incident thereto, and
(d) second light deflection means having an axial line extending along a fourth direction different from the third direction for receiving the parallel light emitted from said second mirror and incident thereto at a second incidence angle and emitting parallel light at a predetermined second emergence angle with respect to the fourth direction depending upon the second incidence angle of the parallel light by the pivotal motion of said second mirror;
said second light deflection means including an external light receiving face provided in an opposed relationship to a light emitting face provided in parallel to the fourth direction for receiving external light incident thereto;
said second light deflection means having a plurality of translucent films provided in the inside thereof;
a light reflectivity of each of said translucent films in a wavelength band other than the wavelength of the light beam being lower than that at the wavelength of the light beam.

8. An optical device, having:
a light receiving face provided in parallel to one direction and adapted to receive light from a light source incident thereto;
a light emitting face provided in parallel to an axial line extending in a direction different from the one direction; and
an external light receiving face provided in an opposing relationship to said light emitting face and adapted to receive external light incident thereto;
said optical device having a plurality of translucent films provided therein;
said translucent films being arrayed in parallel to each other in a spaced relationship from each other along the axial line and disposed in an inclined relationship to the axial line;
light from said light source incident to said light receiving face being reflected by said translucent films and emitted from said light emitting face while external light incident from said external light receiving face is emitted from said light emitting face;
a light reflectivity of each of said translucent films in a wavelength band other than the wavelength of the light from said light source being lower than a light reflectivity of each of said translucent films at the wavelength of the light from the light source, the light reflectivity of each of said translucent films at the wavelength of the light from the light source being 5% or less.

* * * * *